Aug. 4, 1936.　　T. C. E. ROWLAND ET AL　　2,049,628
VEHICLE BRAKE
Filed Dec. 16, 1935　　4 Sheets-Sheet 1

INVENTORS:
THOMAS CARLYLE ELLISON ROWLAND
HARRY PARKER
BY: Ruege & Boyce
ATTORNEYS Aug. 4, 1936.   T. C. E. ROWLAND ET AL   2,049,628
VEHICLE BRAKE
Filed Dec. 16, 1935   4 Sheets-Sheet 2

INVENTORS:
THOMAS CARLYLE ELLISON ROWLAND
HARRY PARKER
BY: Ruege + Boyce
ATTORNEYS

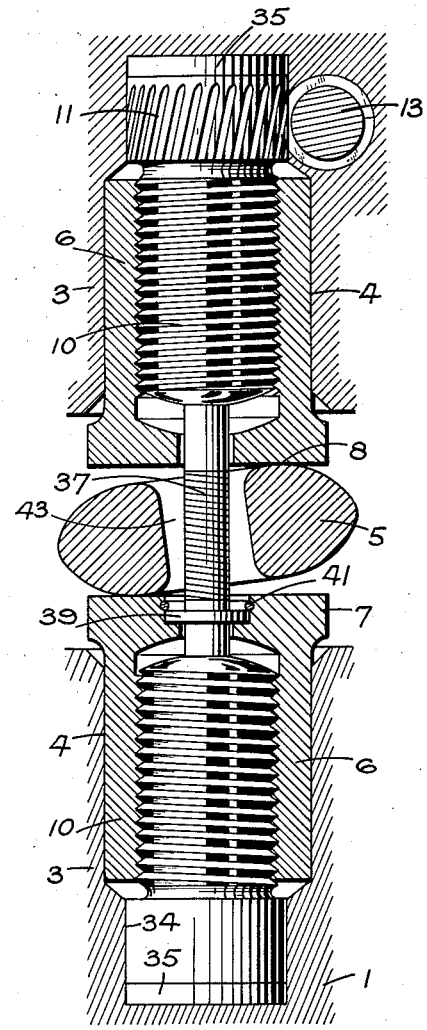

Patented Aug. 4, 1936

2,049,628

UNITED STATES PATENT OFFICE 2,049,628

VEHICLE BRAKE

Thomas Carlyle Ellison Rowland, Solihull, and Harry Parker, King's Heath, Birmingham, England Application December 16, 1935, Serial No. 54,648
In Great Britain September 28, 1934

11 Claims. (Cl. 188—79.5)

This invention relates to vehicle brakes of the kind wherein one or more brake shoes is or are acted upon by a cam or its equivalent to move it or them into contact with the brake drum.

In order to provide an automatic adjustment to compensate for the wear of the brake lining material on the shoe, it has been proposed to provide an automatic adjusting device consisting of a movable abutment sometimes placed on the end of the shoe, and to provide an adjusting device consisting of screw and nut mechanism, cam mechanism or the like, for automatically moving the abutment when the amount of motion necessary to apply the brake becomes excessive. One known method of operating this adjustment device is by means of mechanism including a ratchet and pawl, one of these members being on a fixed part, and the other partaking of the motion of the shoe, so that when that motion becomes excessive, the teeth of the ratchet and pawl over-ride and the ratchet is advanced by one tooth on the return movement, causing an adjustment of the movable abutment on the shoe.

The ratchet and pawl mechanism used for operating the adjustable abutment through the medium of screw and nut or cam mechanism is irreversible, so that once an automatic adjustment has taken place, the mechanism cannot of itself restore the parts to the previous position.

It is found in connection with vehicle brakes that if the brakes are used frequently, as in a passenger vehicle traversing a city, the brake drums become heated and expand, and one of the difficulties encountered with automatic adjustments of the kind referred to, is that an automatic adjustment may take place while the drums are in an expanded condition, with the result that when the brake drums cool and return to their original size, the lining material on the shoes will be found to be in contact with the drums even when the brackets are in the "off" position.

The object of the present invention is to overcome this difficulty, and this is done by introducing into the automatic adjustment mechanism an element which very greatly reduces the amount of adjustment imparted to the adjustable abutment when the ratchet gear over-rides a tooth.

Further, it is found in connection with vehicle brakes of the kind including a pair of brake shoes pivotally mounted upon the same or adjacent pivots within a brake drum and adapted to be expanded by means of a cam or the like operating between their free ends, that the leading brake shoe in the direction of rotation does much more work than does the trailing brake shoe. This is due to the fact that the rotary motion of the drum tends to increase the pressure contact between the leading shoe and itself and tends to decrease the pressure contact between the trailing shoe and itself.

Thus in a brake of this kind, if separate automatic adjusting devices are provided on the two shoes so that with the brake in the "off" position, the clearance between the lining material of each shoe and the interior of the drum is kept constant, the leading shoe will wear out very much more quickly than the trailing shoe.

It is of course necessary to put the vehicle out of action each time any of the brake shoes require relining, and with the present arrangement the frequency with which the vehicle must be put out of action for the necessary repair is determined by the relatively short life of the lining on the leading brake shoe of the pair.

A further object of the present invention is to reduce the frequency with which brake shoe lining repairs are required, and this is done by making the brake shoes share the work of braking equally or substantially equally, instead of letting the leading brake shoe do substantially more work than does the trailing shoe.

Referring to the drawings:—

Figure 5 is a view corresponding to Figure 4 but showing a modified construction.

Figure 1:
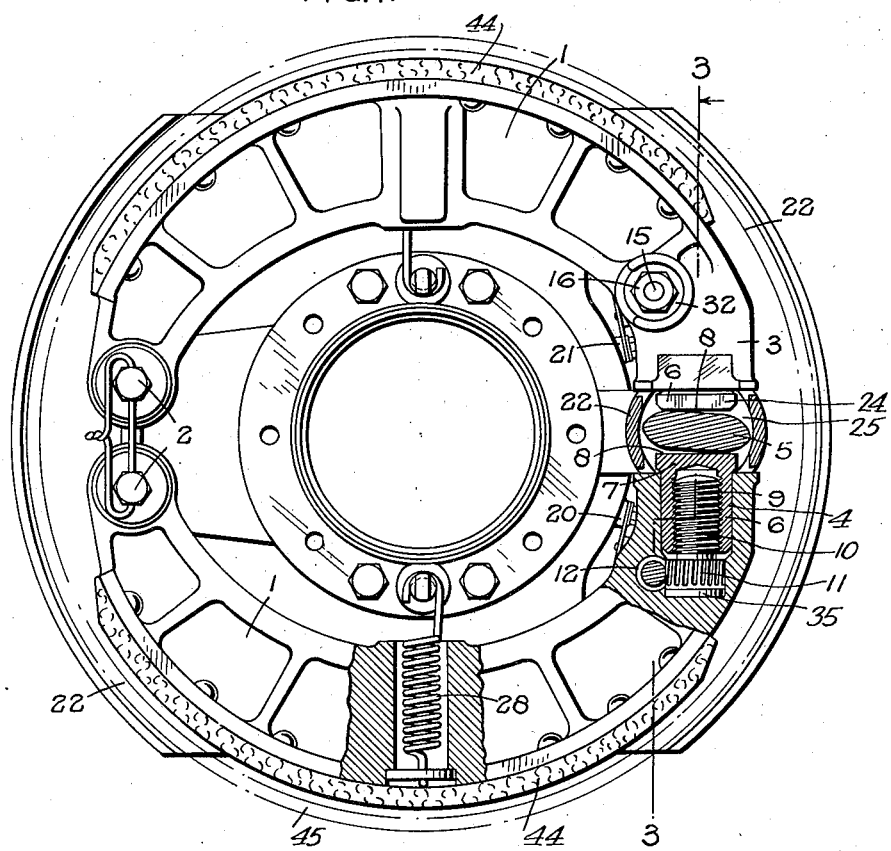
Figure 1 is a view in elevation of one form of brake mechanism constructed in accordance with the present invention.

In the construction illustrated, each brake shoe 1 is pivoted at one end 2, and at its other or free end 3 has a cylindrical recess 4, the axis of which is at right angles to the longitudinal centre line of the operating cam 5.

Slidably mounted in this recess 4 is a hollow pin 6, the outer end 7 of which is flanged to provide an operating face 8 for the cam 5 to act upon.

The hollow pin 6 is screw threaded internally at 9, preferably with a thread of relatively small pitch for fine adjustment.

Rotatably mounted at the inner end of the recess 4 is a screw 10 which engages the thread 9 in the hollow pin 6, and at its inner end this screw 10 is provided with a worm or skew gear wheel 11, the end of which bears against a hardened pad 35.

This worm wheel 11 is engaged by a worm 12 mounted upon a worm spindle 13 disposed in a bore 14 formed through the brake shoe, this spindle extending through the ends of the bore 14 and having at one end a screwed shank 15 on which is mounted a nut 16, whilst a ratchet wheel 17 is secured to the opposite end of the spindle by means of a nut 18. Two ratchet wheels 17 may be provided on each spindle 13, these two ratchet wheels having their teeth staggered, the rack engaging with the two wheels being wide enough to extend across the peripheries of both wheels. The effect is the same as if a single ratchet wheel were used having half the pitch of the wheels shown.

The spindle 13 is provided with a tensioning or friction device in the form of a spring 30 which is compressed by the nut 16 so that the pin is subject to an endwise force causing friction between the shoulder 31 and the adjacent part of the shoe, and also between the washer 32 and the spring 30.

Co-operating with each of the ratchet wheels 17 is a ratchet rack 19 mounted upon a spring or resilient strip 20 attached at one end to a boss 21 on a side plate 22 of the stationary housing for the brake mechanism, the strip 20 retaining the rack in engagement with the teeth of the corresponding wheel 17.

Alternatively, each rack 19 may be pivotally mounted upon the plate 22, and a separate spring may be provided for retaining the rack resiliently in engagement with its wheel 17.

Each rack 19 is arranged substantially parallel to the direction of movement of the part of the brake shoe on which the wheel 17 is mounted, so that the wheel 17 can move over the rack as will hereinafter be described.

A cover 23 is mounted over each wheel 17 to minimize the possibility of dirt or other foreign material falling onto or clogging the teeth of the wheel 17 for the rack 19, and thereby interfering with the operation of the mechanism. Alternatively, a cover may be formed integrally with the shoe.

In order to prevent rotation of the hollow pins 6, each pin has flats on opposite sides 24 of the flanged head 7, these flats engaging between flanges 25 and 26, on or formed integrally with the pin 27 carrying the cam 5.

Figure 2:
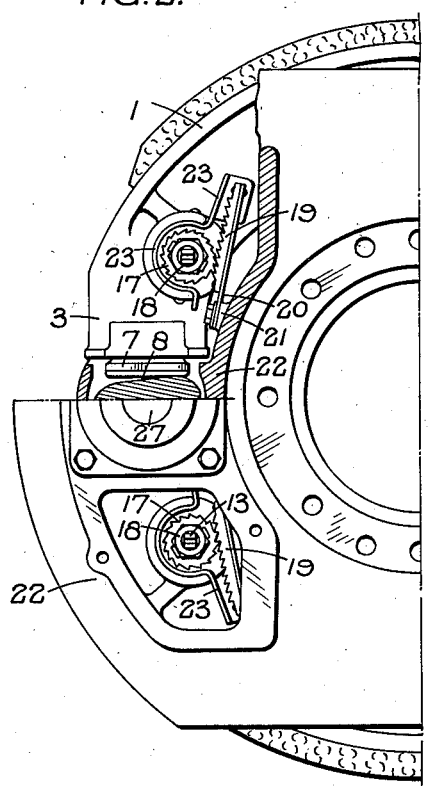
Figure 2 is a part-sectional elevation looking in the opposite direction.
Figure 3:
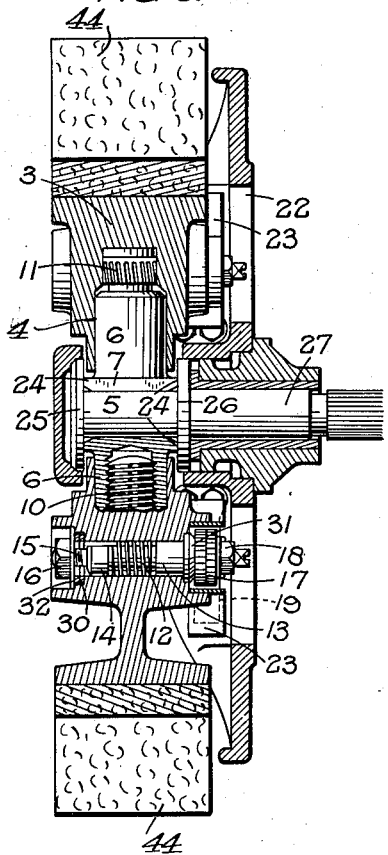
Figure 3 is a section on line 3—3 of Figure 1.

In operation when the brake is applied, the shoes 1 move about the pivots at the ends 2 and against the action of the return springs 28, but since the racks 19 are mounted upon a stationary portion of the structure the ratchet wheels 17 move relative to the racks, and due to the shape of the teeth as is shown in Figure 2. each wheel 17 moves over the teeth of the corresponding rack 19. During this action the spindles 13 are prevented from rotary movement by the friction at the shoulder 31 and at the washer 32.

No movement of the spindle 13 takes place, unless the relative movement between the wheel and the rack exceeds the length of one of the ratchet teeth, since the wheel can move relative to the rack in a return direction to the original position unless one of the teeth of the wheel 17 rides over one of the teeth of the rack 19.

When this occurs, rotary movement of the spindle 15 takes place on the return movement of the brake shoes after operation, and if the wheel 17 has moved relative to the rack 19 to the extent of the length of one of the ratchet teeth, the spindle 15 is rotated by a corresponding amount.

This small rotary movement of the worm spindle 15 is transmitted to the associated worm wheel 11 through the worm 13 and thus to the screw 10.

The hollow pin 6 is slidden out of the recess 4 by the rotation of the screw 10, and the operating face upon which the cam 5 operates is thus moved towards the cam by a very small amount.

The actual movement of the operating face 8 of the sliding pin is almost imperceptible due to the fact that the relative movement between the wheel 17 and the rack 19 is reduced by the worm 13 and the worm wheel 11 but the result is that any increase in the clearance between the friction linings 44 on the brake shoes and the interior surface of the brake drum 45 is compensated for as soon as this clearance exceeds an amount corresponding with the pitch of the ratchet teeth.

Thus the clearance between the friction linings and the interior of the brake drum is never allowed to vary by more than a very small amount, and wear is automatically compensated and taken up.

Figure 4:
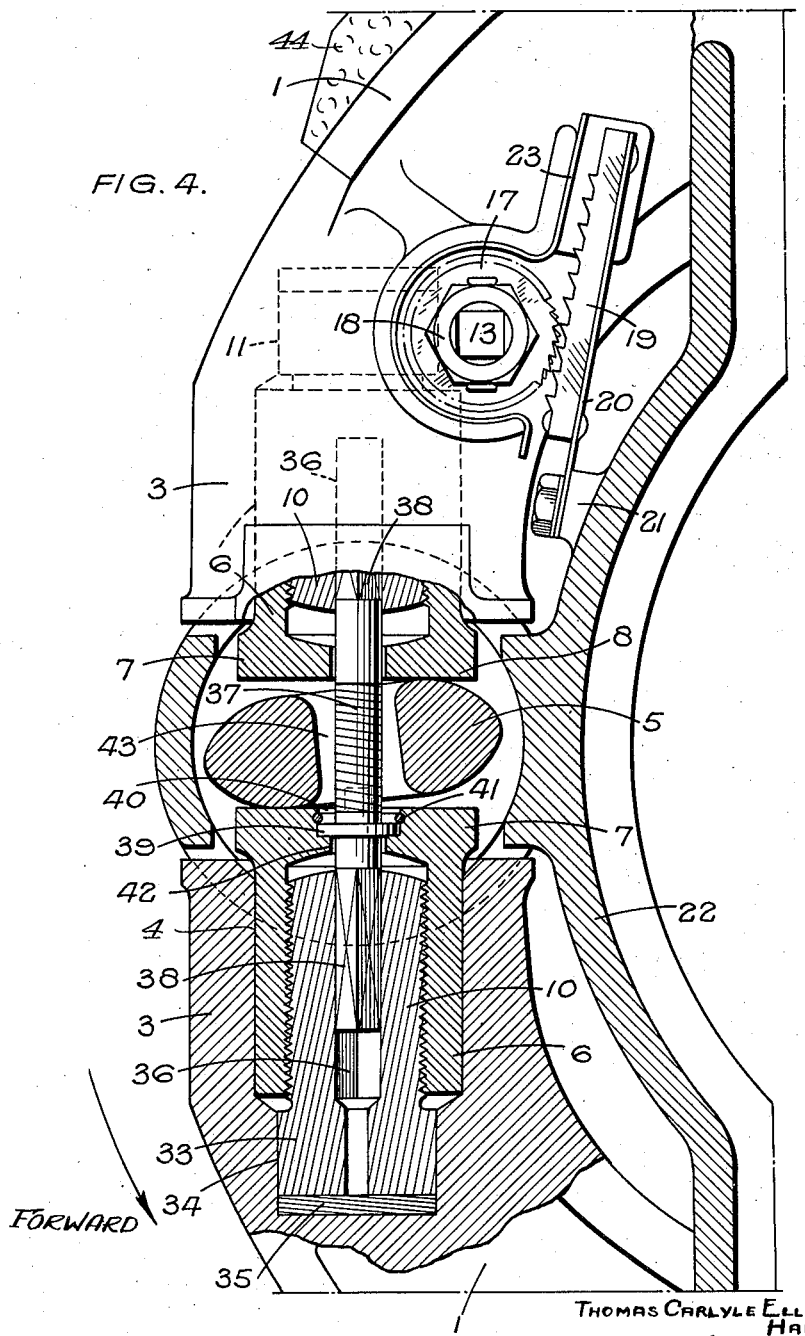
Figure 4 is a part-sectional view showing another arrangement.

In the construction shown in Figure 4, the rack 19 and ratchet 17 are applied to the trailing shoe only, the ratchet wheel 17 driving the pin 13 having the worm 12 co-operating with the worm wheel 11 on the screw 10 as in the previously described construction.

The screw 10 of the other shoe is not provided with a worm portion 11, but terminates in a plain cylindrical portion 33 adapted to rotate in the recess 34 in the end of the brake shoe, a hardened pad 35 being placed between the end of the part 33 and the end of the recess 34.

In this construction each screw 10 is provided with a central hole 36 which is non-circular in cross section, and a shaft or pin 37 is provided mechanically coupling together the two screws 10. The centre part of the shaft 37 may be flexible, and each of its end parts may be fitted with a non-circular sleeve 38 engaging in the screws 10.

The sleeve 38 engaging in one of the screws 10 is provided with a flange 39 located in a recess 40 in the end of the pin 6 forming one of the adjustable abutments, and a split ring 41 is sprung into a recess in the opening 40 so as to locate the pin or shaft 37 against endwise movement.

The other screw 10 can move axially in relation to the other sleeve 38 upon the shaft or pin 37.

The two screws 10 in this arrangement are of opposite hand, so that when the pin or shaft 37 is rotated, the pins 6 will be moved in opposite directions.

The point of contact between the cam 5 and the one pin 6 is nearer to the centre of the pivot of the brake shoe than is the corresponding point of contact between the cam and the other pin 6. Less movement is therefore required for one pin 6 than the other in order to produce an equal movement at the wearing surface of the brake shoe. In order to avoid this, the screw 10 in the brake shoe where the point of contact between the cam and the pin 6 is nearest the pivoting point of the brake shoe may be of slightly less pitch than the screw 10 in the other brake shoe as shown in Figure 5.

Openings 42 are made in the ends of the pins 6 in order to allow the pin or shaft 37 to pass freely therethrough, and a clearance opening 43 is made in the cam 5.

In the arrangements illustrated in Figures 4 and 5, the two shoes are always adjusted to exactly the same amount, so that their linings wear out at the same rate.

With the construction according to the present invention, the operating levers or pedals for the brake mechanism are always retained in the normal or effective position, and do not become partially ineffective or useless for part of the travel due to increase of clearance between the working surface of the brake shoes and the interior of the brake drum.

In the application of the invention to brakes operated by air, oil or vacuum cylinders, or in which the operation is assisted by air, oil or vacuum, the invention enables economy in the air, oil, or vacuum, since the amount of travel of the brake shoes is always substantially constant and it is unnecessary to provide for movement sufficiently large to accommodate or compensate for wear of the brake shoes in use. Accordingly the cylinders of the actuating mechanism may be shorter or of smaller capacity with a consequent reduction in cost.

It will be understood that various changes in and modifications of the constructions herein shown and described may be made, within the scope of the appended claims, without departing from the spirit of our invention or sacrificing its advantages.

What we claim then is—

1. In a vehicle brake, the combination of a fixed support, a rotating drum, a shoe pivoted at one end to said support, a friction lining on said shoe, a movable abutment provided at the free end of said shoe, an actuating member engaging said abutment and adapted to move said shoe into contact with said drum, a screw mounted in said shoe and engaging a threaded bore in said abutment, said screw being rotatable to advance said abutment toward said actuating member to compensate for wear of said friction lining, means for rotating said screw automatically, when the amount of shoe travel required to apply the brake becomes excessive, in a manner to reduce the travel necessary, and reduction gearing interposed between said screw and the means for rotating it.

2. In a vehicle brake, the combination of a fixed support, a rotating drum, a shoe pivoted at one end to said support, a friction lining on said shoe, a movable abutment provided at the free end of said shoe, an actuating member engaging said abutment and adapted to move said shoe into contact with said drum, an adjustment device for advancing said abutment toward said actuating member to compensate for wear of said friction lining, means for operating said adjustment device automatically, when the amount of shoe travel required to apply the brake becomes excessive, in a manner to reduce the travel necessary and worm or skew gearing interposed between said adjustment device and the operating means therefor.

3. In a vehicle brake, the combination of a fixed support, a rotating drum, a shoe pivoted at one end to said support, a friction lining on said shoe, a movable abutment provided at the free end of said shoe, an actuating member engaging said abutment and adapted to move said shoe into contact with said drum, a screw mounted in said shoe and engaging a threaded bore in said abutment, said screw being rotatable to advance said abutment towards said actuating member to compensate for wear of said friction lining, a worm wheel provided on said screw and a worm engaging said worm wheel, and means for rotating said worm automatically, when the amount of shoe travel required to apply the brake becomes excessive, in a manner to reduce the travel necessary.

4. In a vehicle brake, the combination of a fixed support, a rotating drum, a pair of shoes pivoted to said support, friction linings on said shoes, a movable abutment provided at the free end of each shoe, an actuating member engaging between said abutments and adapted to move said shoes into contact with said drum, adjustment devices for advancing said abutments towards said actuating member to compensate for wear of said friction linings, means for operating one of said adjustment devices automatically, when the amount of shoe travel required to apply the brake becomes excessive, in a manner to reduce the travel necessary, reduction gearing interposed between said adjustment device and the operating means therefor, and a mechanical coupling between the two adjustment devices whereby both abutments are simultaneously advanced.

5. In a vehicle brake, the combination of a fixed support, a rotating drum, a pair of shoes pivoted to said support, friction linings on said shoes, a movable abutment provided at the free end of each shoe, an actuating member engaging between said abutments and adapted to move said shoes into contact with said drum, a screw mounted in each shoe and engaging a threaded bore in the abutment associated therewith, said screws being rotatable to advance said abutments towards said actuating member to compensate for wear of said friction linings, means for rotating one of said screws automatically, when the amount of shoe travel required to apply the brake becomes excessive, in a manner to reduce the travel necessary, reduction gearing interposed between said screw and the means for rotating it, and a mechanical coupling between the two screws whereby both abutments are simultaneously advanced.

6. In a vehicle brake, the combination of a fixed support, a rotating drum, a shoe pivoted at one end to said support, a friction lining on said shoe, a movable abutment provided at the free end of said shoe, an actuating member engaging said abutment and adapted to move said shoe into contact with said drum, a screw mounted in said shoe and engaging a threaded bore in said abutment, said screw being rotatable to advance said abutment towards said actuating member to compensate for wear of said friction lining, a worm wheel provided on said screw, a pin mounted in a transverse hole in said shoe, a worm on said pin which engages with said worm wheel, a ratchet wheel mounted on said pin, and a pawl or the equivalent carried by said fixed support and engaging said ratchet wheel.

7. In a vehicle brake, the combination of a fixed support, a rotating drum, a shoe pivoted at one end to said support, a friction lining on said shoe, a movable abutment provided at the free end of said shoe, an actuating member engaging said abutment and adapted to move said shoe into contact with said drum, a screw mounted in said shoe and engaging a threaded bore in said abutment, said screw being rotatable to advance said abutment towards said actuating member to compensate for wear of said friction lining, a worm wheel provided on said screw, a pin mounted in a transverse hole in said shoe, a worm on said pin which engages with said worm wheel, a ratchet wheel mounted on said pin, a pawl or the equivalent carried by said fixed support and engaging said ratchet wheel, and friction means resisting rotation of said pin.

8. In a vehicle brake, the combination of a fixed support, a rotating drum, a shoe pivoted at one end to said support, a friction lining on said shoe, a movable abutment provided at the free end of said shoe, an actuating member engaging said abutment and adapted to move said shoe into contact with said drum, spaced flanges on said actuating member, an adjusting member rotatably mounted in said shoe and having a screw connection with said abutment, means for rotating said adjusting member automatically, when the amount of shoe travel required to apply the brake becomes excessive, in a manner to reduce the travel necessary, reduction gearing interposed between said adjusting member and the means for rotating same, and flats on said abutment engaging said flanges so as to prevent rotation of said abutment axially of its screw connection with said adjusting member.

9. In a vehicle brake, the combination of a fixed support, a rotating drum, a pair of shoes pivoted to said support, friction linings on said shoes, a movable abutment provided at the free end of each shoe, an actuating member engaging between said abutments and adapted to move said shoes into contact with said drum, adjustment devices for advancing said abutments towards said actuating member to compensate for wear of said friction linings, means for operating one of said adjustment devices automatically, when the amount of shoe travel required to apply the brake becomes excessive, in a manner to reduce the travel necessary, and a mechanical coupling between the two adjustment devices whereby both abutments are simultaneously advanced.

10. In a vehicle brake, the combination of a fixed support, a rotating drum, leading and trailing shoes pivoted to said support, friction linings on said shoes, a movable abutment provided at the free end of each shoe, an actuating member engaging between said abutments and adapted to move said shoes into contact with said drum, adjustment devices for advancing said abutments towards said actuating member to compensate for wear of said friction linings, means for operating automatically the adjustment device associated with said trailing shoe, when the amount of shoe travel required to apply the brake becomes excessive, in a manner to reduce the travel necessary, reduction gearing interposed between said adjustment device and the operating means therefor, and a mechanical coupling between the two adjustment devices whereby both abutments are simultaneously advanced.

11. In a vehicle brake, the combination of a fixed support, a rotating drum, a pair of shoes pivoted to said support, friction linings on said shoes, a movable abutment provided at the free end of each shoe, an actuating member engaging between said abutments and adapted to move said shoes into contact with said drum, a screw mounted in each shoe and engaging a threaded bore in the abutment associated therewith, said screws being of different pitch and being rotatable to advance said abutments towards said actuating member to compensate for wear of said friction linings, means for rotating one of said screws automatically, when the amount of shoe travel required to apply the brake becomes excessive, in a manner to reduce the travel necessary, reduction gearing interposed between said screw and the means for rotating it, and a mechanical coupling between the two screws whereby both abutments are simultaneously advanced, on movement of said screw-rotating means, by amounts proportionate to the respective pitches of the two screws.

THOMAS CARLYLE ELLISON ROWLAND.
HARRY PARKER.